US008873654B2

(12) United States Patent
Golovins

(10) Patent No.: US 8,873,654 B2
(45) Date of Patent: Oct. 28, 2014

(54) METHOD FOR IMPROVING CHANNEL ESTIMATION PERFORMANCE IN DYNAMIC SPECTRUM ACCESS MULTICARRIER SYSTEMS

(75) Inventor: Jevgenijs Golovins, Riga (LV)

(73) Assignee: University of Cape Town, Cape Town (ZA)

( * ) Notice: Subject to any disclaimer, the term of this patent is extended or adjusted under 35 U.S.C. 154(b) by 78 days.

(21) Appl. No.: 13/514,346

(22) PCT Filed: Dec. 8, 2010

(86) PCT No.: PCT/IB2010/003140
§ 371 (c)(1),
(2), (4) Date: Jun. 7, 2012

(87) PCT Pub. No.: WO2011/070427
PCT Pub. Date: Jun. 16, 2011

(65) Prior Publication Data
US 2012/0243630 A1    Sep. 27, 2012

(30) Foreign Application Priority Data
Dec. 8, 2009   (ZA) .................................. 2009/08684

(51) Int. Cl.
*H04K 1/10*   (2006.01)
*H04W 52/32*   (2009.01)
*H04B 17/00*   (2006.01)
*H04W 52/34*   (2009.01)

(52) U.S. Cl.
CPC ........... *H04B 17/005* (2013.01); *H04W 52/325* (2013.01); *H04B 17/0077* (2013.01); *H04W 52/346* (2013.01); *H04B 17/0045* (2013.01)
USPC ...................................................... 375/260

(58) Field of Classification Search
CPC .................................................. H04B 17/0045

USPC ........................................................ 375/260
See application file for complete search history.

(56) References Cited

U.S. PATENT DOCUMENTS 7,715,358 B2 *   5/2010   Li et al. ................. 370/344
2006/0198455 A1 *   9/2006   Fujii et al. .................. 375/260

(Continued)

OTHER PUBLICATIONS

Golovins, E. et ai, Optimal Pilot Pattern Design for Dynamic Spectrum Access MIMO Multicarrier Systems, Personal Indoor and Mobile Radio Communications 2009 IEEE 20th International Symposium on, Dept. of Electr. Eng, Univ. of Cape Town, Cape Town, South Africa, Sep. 13-16, 2009, pp. 2030-2034.*

(Continued)

*Primary Examiner* — Chieh M Fan
*Assistant Examiner* — Santiago Garcia
(74) *Attorney, Agent, or Firm* — Andrus Intellectual Property Law, LLP

(57) ABSTRACT

A method for improving channel estimation performance in dynamic spectrum access multicarrier systems is disclosed. The method includes determining a pattern of pilot symbols to be included in transmitted signals sent from a sender to a receiver through an interference-affected propagation environment by deriving a covariance matrix of interference and white Gaussian noise ($R_{ww}$) based on external measurements for the propagation environment, determining the placement of a predetermined number of equally powered pilot symbols by computing a placement that results in the minimum sum of square errors of a maximum likelihood channel estimation performed based on the covariance matrix, and with the pilot symbols in their placed positions, determining a relative power distribution between the placed pilot symbols by computing the power distribution that results in the minimum sum of square errors of a maximum likelihood channel estimation performed based on the covariance matrix.

8 Claims, 5 Drawing Sheets

(56) References Cited

U.S. PATENT DOCUMENTS

| | | | |
|---|---|---|---|
| 2006/0251156 A1* | 11/2006 | Grant et al. | 375/148 |
| 2009/0279589 A1* | 11/2009 | Nguyen | 375/141 |
| 2009/0279623 A1* | 11/2009 | Wu et al. | 375/260 |
| 2009/0316821 A1* | 12/2009 | Jung et al. | 375/267 |
| 2010/0046684 A1* | 2/2010 | De Lind Van Wijngaarden et al. | 375/363 |

OTHER PUBLICATIONS

Golovins, E. et al, Optimal Pilot Pattern Design for Dynamic Spectrum Access MIMO Multicarrier Systems, Personal Indoor and Mobile Radio Communications 2009 IEEE 20th International Symposium on, Dept. of Electr. Eng, Univ. of Cape Town, Cape Town, South Africa, Sep. 13-16, 2009, pp. 2030-2034 Titel; Abstract; Section I, "Introduction"—Section IV "Optimal Distribution of Pilot Symobls Power".

Jun Ma et al, "Signal Processing in Cognitive Radio", Proceedings of the IEEE of Electr. & Comput Eng., Georgia Inst. of Technol., Atlanta, USA, vol. 97, Issue 5, May 2009, pp. 805-823.

International Search Report dated Mar. 25, 2011.

* cited by examiner

METHOD FOR IMPROVING CHANNEL ESTIMATION PERFORMANCE IN DYNAMIC SPECTRUM ACCESS MULTICARRIER SYSTEMS

CROSS-REFERENCE TO RELATED APPLICATIONS

This application claims priority to PCT/IB2010/003140, filed Dec. 8, 2010, and published in English language as Publication No. WO 2011/070427 on Jun. 16, 2011, which claims priority to ZA Application No. 2009/08684, filed Dec. 8, 2009, incorporated herein by reference.

FIELD OF THE INVENTION

This invention relates to wireless multicarrier communication systems, and more specifically to a method for improving the channel estimation performance of dynamic spectrum access multicarrier systems.

BACKGROUND TO THE INVENTION

One problem in wireless communication is that of multipath propagation, a phenomenon in which the original transmitted signal arrives at the receiver accompanied by a number of its heavily attenuated replicas each with a different magnitude, phase and time-of-arrival. Multipath propagation occurs due to the transmitted signal traversing various echo paths between the transmitter and receiver.

Channel estimation refers to various techniques for identifying the response of the multipath channel to a unit-pulse signal in either time or frequency domain so that this response information can be used in the detection process to improve the information reliability at the receiver.

Frequency-selective multipath propagation results when different harmonics of the transmitted signal are attenuated differently due to destructive or constructive interference between the signal replicas traversing different paths. If multipath propagation is frequency-selective then it is no longer possible to apply the same conventional time-domain channel estimation techniques to the entire frequency range of the received signal. This makes channel estimation much more complex, and is often referred to as the frequency selectivity problem.

Multicarrier communication is a natural and promising solution aimed at solving the frequency selectivity problem. In multicarrier communication, the transmission is divided into parallel, fixed sub-channels (also called subcarriers) with narrow enough bandwidths so as to make them almost frequency-flat, i.e., the effects of frequency-selective channel conditions can be considered as constant over a specific sub-channel. Thus, instead of sophisticated serial equalisation techniques to compensate for channel impairments at the receiver, one can employ relatively simple block-wise frequency domain equalisation techniques. To reliably recover the transmitted data, accurate estimation of the channel state information at the receiver is required to be able to determine the equaliser coefficients. Channel state information can be determined by identifying the channel frequency response or the channel impulse response.

Among the channel estimation techniques, training-based, in particular pilot-assisted methods, have gained noticeable popularity due to their simplicity, reliability and adaptability. Pilot-assisted channel estimation relies on a small number of pilot symbols being multiplexed along with the data into the transmitted signal. Channel response parameters (e.g. the required equaliser gain and phase shift for each subcarrier) can be estimated by filtering and interpolating the received pilot symbols.

Recently there has been extensive research into establishing optimal pilot pattern design for conventional multicarrier systems, such as orthogonal frequency division multiplexing (OFDM) systems operating under white Gaussian noise conditions. It has been shown that in OFDM systems, maximisation of the average lower bound on the transmission capacity, which is equivalent to the minimisation of channel estimation minimum mean square error (MMSE), is achieved only through an equally spaced (ES) pilot pattern with equal power distribution among the pilot symbols.

Cognitive radio refers to wireless communication applications that adaptively utilize unoccupied frequency bands by means of a technique known as dynamic spectrum access (DSA). Dynamic spectrum access permits secondary band (unlicensed) users to communicate without affecting primary band (licensed) user transmissions. An example of such a system is described in US published patent application number 20090274081 in the name of T. S. Kwon et al entitled, "Device to Sense Frequency Band to Share Operating Frequency Bands in Heterogeneous Communication Systems and Method thereof".

Recently, it has been proposed to use multicarrier systems in dynamic spectrum access cognitive radio applications. Dynamic spectrum access systems introduce a great range of uncertainties with regard to the optimal pilot pattern design, due to the inherent adaptation requirements for the transmitted signal. In cognitive radio applications, secondary band users may experience interference from primary users. This interference can originate from remote high-power transmission sources or from other system spectrum side lobes in the adjacent frequencies. As a result, cognitive radio multicarrier systems are forced to operate under conditions of arbitrarily located virtual subcarriers (i.e. subcarriers unsuitable for transmission) and non-white additive noise (i.e. white Gaussian noise plus interference). This makes all the previous optimal pilot pattern designs generally inapplicable to dynamic spectrum access multicarrier systems.

OBJECT OF THE INVENTION

It is an object of this invention to provide a method for improving channel estimation performance in dynamic spectrum access multicarrier systems.

SUMMARY OF THE INVENTION

In accordance with the invention there is provided a method for improving the channel estimation performance in a dynamic spectrum access multicarrier system that utilizes a pattern of pilot symbols to be included in transmitted signals sent from a sender to a receiver through an interference-affected propagation environment, the method comprising adaptively determining the pattern of pilot symbols to be included in the transmitted signals by carrying out the following steps:
 a) explicitly characterising the interference-affected propagation environment by defining a covariance matrix of interference and white Gaussian noise based on external measurements for the propagation environment;
 b) determining the placement of a predetermined number of equally powered pilot symbols by computing a placement that results in the minimum sum of square errors of a maximum likelihood channel estimation performed based on the covariance matrix, and c) with the pilot symbols in their placed positions, determining a relative power distribution between the placed pilot symbols by computing the power distribution that results in the minimum sum of square errors of a maximum likelihood channel estimation performed based on the covariance matrix.

Further features of the invention provide for the external measurements in step (a) to be done by means of spectrum sensing techniques; and for the placement of pilot symbols in step (b) to be computed by finding an equally spaced pilot pattern that results in the least sum of square errors fit to the covariance matrix where the covariance matrix has been constrained to be diagonal, and for the position of each pilot symbol to be iteratively updated so as to result in the minimum sum of square errors of a maximum likelihood channel estimation performed based on the covariance matrix.

Still further features of the invention provide for the external measurements of the propagation environment, the determination of the position of the pilot symbols and the determination of the relative power distribution between the placed pilot symbols to be carried out by the receiver, and the receiver to send the computed position and relative power distribution of the pilot symbols (hereafter referred to as the "pattern of pilot symbols") to the sender so that the sender can include the pilot symbols in its transmitted signals.

Still further features of the invention provide for the method to include the additional step of determining the phase assignment between the predetermined number of pilot symbols by computing a phase value set that results in the minimum sum of square errors of a maximum likelihood channel estimation performed based on the covariance matrix.

According to one aspect of the invention, a new pattern of pilot symbols is determined each time the covariance matrix of the interference and white Gaussian noise changes.

According to different aspect of the invention, a new pattern of pilot symbols is determined at regular preset time intervals.

Further features of the invention provide for the method to include the steps, prior to the receiver determining the pattern of pilot symbols, of the sender detecting its surrounding interference and noise levels across a range of subcarriers to determine which subcarriers are available for transmission, and transmitting the information about which subcarriers are available for transmission to the receiver, so that the receiver can compute the pattern of pilot symbols in such a way that no pilot symbols are placed in subcarriers that are unavailable for transmission by the sender.

Still further features of the invention provide for the method to include the additional step of determining the phase assignment for each of the pilot symbols by computing a phase value set that results in the minimum sum of square errors of a maximum likelihood channel estimation performed based on the covariance matrix.

Yet further features of the invention provide for the method to include an initial step of determining the predetermined number of pilot symbols to be included in each transmission block as equal to a channel impulse response length of the system, thereby ensuring that the number of pilot symbols included is the minimum number required for reliable channel estimation.

DETAILED DESCRIPTION OF THE INVENTION

Figure 1A:
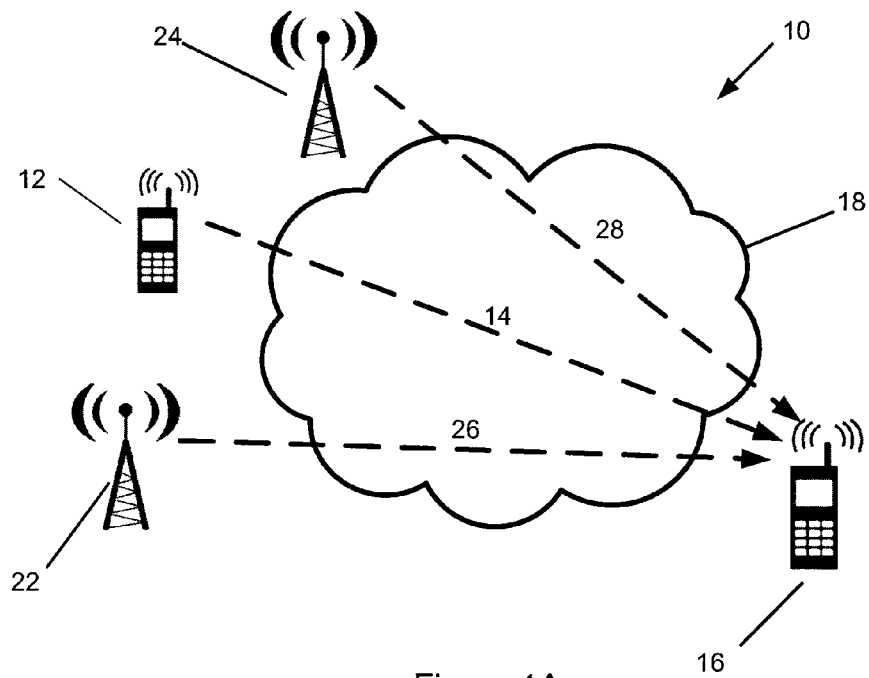
FIG. 1A is a schematic illustration of a dynamic spectrum access multicarrier system.

The following is a list of the acronyms used in this specification and their meanings:
CFR Channel Frequency Response
CIR Channel Impulse Response
CDMA Code Division Multiple Access
DFT Discrete Fourier Transform
DSA Dynamic Spectrum Access
ES Equally Spaced
IDFT Inverse Discrete Fourier Transform
IFDMA Interleaved Frequency Division Multiple Access
LSSE Least Sum of Square Errors
ML Maximum Likelihood
MMSE Minimum Mean Square Error
OFDM Orthogonal Frequency Division Multiplexing
PAR Peak to Average power Ratio
PP Pilot Pattern
PSD Power Spectral Density
SIR Signal-to-Interference power Ratio
SNR Signal-to-Noise power Ratio
SSE Sum of Square Errors
WGN White Gaussian Noise The following is a list of certain important variables used in this specification and their meanings:
$R_{\xi\xi}$ The interference covariance matrix
$R_{vv}$ The White Gaussian noise covariance matrix
$R_{ww}$ The covariance matrix of interference and white Gaussian noise mixture
$\underline{h}$ The channel impulse response vector
$\hat{\underline{h}}$ The estimate of the channel impulse response vector
h The channel frequency response vector FIG. 1A schematically illustrates a wireless communication system, which in this invention is a dynamic spectrum access multicarrier communication system (10). The communication system includes a secondary, unlicensed transmitter (12) which wirelessly transmits signals (14) to a receiver (16) through a signal propagation environment (18). The signal propagation environment is characterized by interference from primary, licensed transmitters (22, 24) that transmit signals (26, 28) which also propagate to the receiver (16). In this illustration only one secondary transmitter (12), two primary transmitters (22, 24) and one receiver (16) is shown, but it will be understood that this is for the purpose of illustration only and an actual system will typically include many transmitters, both licensed and unlicensed, and many receivers. It will also be appreciated that any particular device could be both a transmitter and a receiver, and that each transmitter and receiver could take any form including an AC powered or battery powered wireless device, a transmission tower, a satellite transmitter or the like.

Figure 1B:
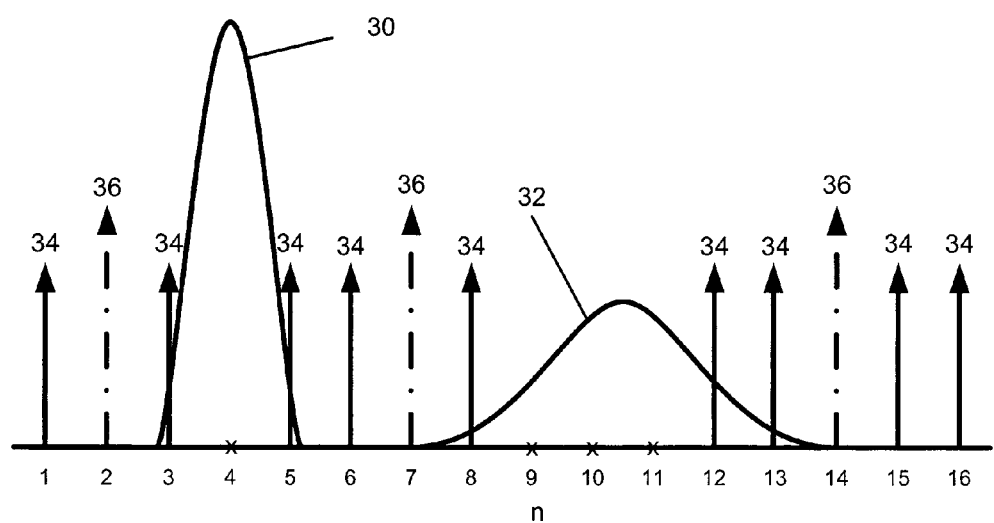
FIG. 1B is a graph showing a portion of the frequency spectrum of an interference-affected propagation environment of the system of FIG. 1A.

FIG. 1B shows a portion of the frequency spectrum of the signal propagation environment (18) as seen at the antenna input of the receiver (16). As this is a multicarrier communication system, the spectrum is divided into multiple parallel subcarriers (n). In this example, sixteen subcarriers are shown although it will be understood that many more subcarriers are typically present in a multicarrier communication system. The propagation environment (18) is affected by interference, which in this example is primarily interference from the sidelobes of the radio spectra of the primary licensed transmitters (22, 24). The first primary licensed transmitter (22) has a spectrum shown by numeral (30) and the second primary licensed transmitter (24) has a spectrum shown by numeral (32). In this example, the spectrum (30) is primarily located at subcarrier 4, and the spectrum (32) is primarily located at subcarriers 9, 10 and 11.

In dynamic spectrum access multicarrier systems, in which unoccupied frequency bands are adaptively utilized, the positions of the subcarriers that are suitable for transmission by the secondary unlicensed transmitter (12) must be adaptively changed based on the propagation environment (18). It is also a requirement that the transmitter not transmit in the primary, licensed transmission bands. In this example, the transmitter (12) must not transmit in subcarriers 4, 9, 10 or 11 so as not to interfere with the primary licensed transmitters. Accordingly, the available subcarriers for transmission of the signal (14) in this example are subcarriers 1, 2, 3, 5, 6, 7, 8, 12, 13, 14, 15 and 16.

The signal (14) received at the receiver (16) is also always contaminated by additive noise. The noise results predominantly from the power amplifier(s) and other active circuit elements in a front-end of the receiver (16). Furthermore, for transmissions that include multipath propagation effects, channel-induced signal dispersion in the time domain is a major performance limiting factor. To be able to reconstruct the signal (14) at the receiver (16), accurate estimation of the channel state information is required (i.e. determination of the channel impulse response) and this is done by the receiver (16) detecting a number of pilot symbols which the transmitter (12) multiplexes along with data into the transmitted signal (14). These pilot symbols enable the receiver to accurately estimate the channel state information by filtering and interpolating the received pilot symbols.

In this example, subcarriers 1, 3, 5, 6, 8, 12, 13, 15 and 16 are used as data subcarriers (34), i.e. for transmitting the data portion of the signal (14), and subcarriers 2, 7 and 14 have been selected as pilot subcarriers (36) for transmitting the pilot symbols. One of the challenges that this invention sets out to address is how to determine in which subcarriers to place the pilot symbols in a dynamic spectrum access multicarrier system. It will be immediately apparent that an equally spaced pattern of pilot symbols is not suitable for a dynamic spectrum access system such as the system of FIGS. 1A and 1B, as this will result in the utilization of subcarriers that are either reserved for the primary licensed users or otherwise have high levels of interference. A poor allocation of pilot symbols will results in poor channel estimation by the receiver, resulting in the signal (14) not being reconstructed properly by the receiver.

This invention provides a method for determining a pilot pattern to be included into the transmitted signals (14) that aims to provide better channel estimation performance in the interference-affected signal propagation environment (18) for a dynamic spectrum access multicarrier system. The first step in determining the desired pilot pattern is characterising the interference-affected signal propagation environment (18).

Step 1: Characterising the Interference-Affected Propagation Environment

To characterise the interference-affected signal propagation environment (18) one first needs to determine a model for the multicarrier communication system to be able to employ block-wise frequency domain equalisation techniques.

Step 1a: Determining a Block-Wise Multicarrier Transmission Model

As already mentioned, to mitigate channel-induced signal dispersion resulting from multipath propagation, it is common practice to incorporate data-bearing and training symbols, called pilot symbols, into the signal transmission in blocks. Then a frequency-domain equalisation approach can be adopted to compensate for the frequency-selective channel impairments at the receiver (16).

Most conventional multicarrier systems (such as OFDM, MC-CDMA, and IFDMA) incorporate discrete Fourier transform (DFT) at the receiver that acts as an expansion basis for frequency-domain equalisation. To account for inter-block interference induced by multipath propagation, a cyclic prefix is inserted at the beginning of each transmitted block. If the cyclic prefix interval is greater than the maximum excess delay of the channel and time synchronisation is perfect, inter-block interference is completely eliminated by discarding the cyclic prefix at the receiver. Furthermore, the cyclic prefix converts the linear convolution of the transmitted signal with the multipath channel impulse response into a circular convolution as seen by the receiver. Then the only remaining effect of the multipath propagation is the random phase and amplitude of each subcarrier, which is easier to cope with because the received data can be recovered by tracking the frequency response (or single complex-valued gain) of the subcarriers by detecting the pilot symbols.

The block transmission concept relies on the theoretical approximation of each parallel, fixed sub-channel (also called subcarriers) in the multicarrier system as time-invariant on the interval of a single block. The most important advantage of this approximation is that a mathematical description of the sub-channel output in a simple linear form can be achieved, which makes the application of computationally-efficient procedures to restore the in-block data symbols at the receiver possible.

Consider a discrete-time baseband communication system that includes a transmitter, a receiver and an equivalent discrete-time band-limited channel model. The transmitter and the receiver are assumed to have ideal timing and frequency synchronisation. Let the selected transmit block be denoted as a vector $x = [x_0 \ldots x_{N-1}]^T$ of N complex-valued symbols carrying a bulk of data and pilot information, which are loaded on the mutually orthogonal and equally spaced narrowband subcarriers. These symbols can take arbitrary complex values, and their distribution depends on the adopted modulation and linear coding scheme. In the DFT-based multicarrier systems, this block is subject to the inverse discrete Fourier transform (IDFT) and is prepended with a cyclic prefix before it passes through the channel. At the receiver, the cyclic prefix is removed and, assuming that the channel response is block-wise time-invariant, the symbol vector after the DFT processing can be written as $$y = Xh + w = XFB\underline{h} + w, \quad (1)$$

where $\underline{h}$ is the $L \times 1$ channel impulse response (CIR) vector (the corresponding cyclic prefix has to contain at least $L-1$ samples, with $L \leq N/4$ typically); $F$ is the non-scaled DFT matrix with the elements $[F]_{k,l} = \exp(-j2\pi kl/N)$, and with the property $F^H F = NI$; $B = [I_{L \times L} \; 0_{L \times (N-L)}]^T$ is the zero-padding matrix; $h = FB\underline{h}$ is the channel frequency response (CFR); $X = dg(x)$ is the diagonal matrix containing transmitted symbols; and $w = \underline{\xi} + v$ is the $N \times 1$ vector of the interference and white Gaussian noise (WGN) mixture. Interference and white Gaussian noise are independent complex-valued Gaussian random processes with zero mean and covariance matrices $R_{\xi\xi} = E[\xi\xi^H]$ and $R_{vv} = E[vv^H] = \sigma_v^2 N^{-1} I$ respectively, hence $R_{ww} = E[ww^H] = R_{\xi\xi} + R_{vv}$. Here the total interference power and the total white Gaussian noise power in the entire band are constrained to $\sigma_\xi^2 = tr(R_{\xi\xi})$ and $\sigma_v^2 = tr(R_{vv})$ (where $tr(\cdot)$ denotes matrix trace). It should be noted that in contrast to the white Gaussian noise covariance matrix ($R_{vv}$), the interference covariance matrix ($R_{\xi\xi}$) is not scaled identity and may not be diagonal in general. Hence transmission performance on individual subcarriers is also influenced by $R_{\xi\xi}$, in addition to the channel state information $\underline{h}$.

It can be seen from (1) that one needs to know the channel impulse response $\underline{h}$ for the recovery of the transmitted symbols $x$ at the receiver. As $\underline{h}$ is typically unknown in advance, it has to be replaced by its estimate $\hat{\underline{h}}$, which can be obtained using pilot symbols. An optimally designed pilot-assisted multicarrier system decouples channel estimation from data detection by loading pilot symbols onto separate subcarrier sets than the transmitted data. The procedure for estimating the channel impulse response ($\hat{\underline{h}}$) based on the set of pilot subcarriers is now described.

Step 1b: Maximum Likelihood Channel Estimator

Consider a system where P subcarriers out of N are assigned for the pilot symbol transmission. Let the pilot subcarriers be indexed as $p_k \in \{0, \ldots, N-1\}$, $k \in \{0, \ldots, P-1\}$. Define the selection matrix C of the $P \times N$ size that is needed to extract samples of the channel frequency response vector h, corresponding to the pilot subcarriers. The elements of C are expressed as $$[C]_{k,n} = \begin{cases} 1, & \text{if } n = p_k \\ 0, & \text{otherwise,} \end{cases} \quad (2)$$

where $k \in \{0, \ldots, P-1\}$ and $n \in \{0, \ldots, N-1\}$.

The vector of the received pilot symbols is described in analogy with the linear equation (1) as $$y^p = Cy = X^p Ch + w^p = X^p CFB\underline{h} + w^p, \quad (3)$$

where $w^p = Cw$ is a vector of P samples of the interference and white Gaussian noise mixture, corresponding to the pilot positions, and the diagonal matrix $X^p = dg(x^p) = dg(Cx)$ contains reference values of P pilot symbols. The total power dedicated to all the pilots is restricted to $\sigma_p^2 = \|x^p\|^2 = tr(X^{pH} X^p)$, where $\|\cdot\|$ denotes the Euclidean norm.

As an essential design requirement, expression (3) should guarantee perfect channel impulse response acquisition by the receiver in the absence of noise and interference, i.e. when $w^p = 0_{P \times 1}$. This is possible only if $rk(X^p CF) = P \geq L$ (where $rk(\cdot)$ denotes matrix rank).

In the presence of interference and white Gaussian noise, one can employ the maximum likelihood (ML) criterion to construct the channel impulse response estimate, which is found by known methods as $$\hat{\underline{h}} = \underset{\underline{h}}{\operatorname{argmin}} \| R_{ww}^{p-1/2}(y^p - X^p CFB\underline{h}) \|^2 \quad (4)$$

$$= SB^H F^H C^H X^{pH} R_{ww}^{p-1} y^p,$$

where $R_{ww}^p = CR_{ww} C^H$ is the interference-plus-WGN covariance matrix at the pilot subcarriers, and $$S = E(\underline{\epsilon}\underline{\epsilon}^H) = (B^H F^H C^H X^{pH} R_{ww}^{p-1} X^p CFB)^{-1} \quad (5)$$

is the covariance matrix of the channel impulse response estimation error $\underline{\epsilon} = \hat{\underline{h}} - \underline{h}$. Hence the sum of square errors (SSE) of the channel impulse response estimate can be computed as $$S = tr(S) \quad (6)$$

It should be noted that design of the Maximum Likelihood estimator (4) is independent of the channel response statistics, but depends on the interference and noise covariance. The covariance matrix of the interference and white Gaussian noise mixture, $R_{ww}$, can be estimated during the spectrum sensing periods, which are employed in the cognitive radio systems to learn characteristics of the radio environment.

The next step is optimising the pilot pattern. This is done in three sub-steps: first, the pilot subcarrier placement is determined. Next, the optimal power loading for the pilot subcarriers is determined and finally, the pilot symbol phase assignment is determined.

Step 2: Pilot Pattern Optimisation

From the mathematical formulation of the pilot transmission in the preceding section it is clear that selection of the optimal pilot pattern (PP) amounts to what the matrix product $X^p C$ should be equal to in order to minimise the sum of square errors of channel estimation. In other words, the optimal pilot parameters are found by solving $$(p_{opt}, x_{opt}^p) = \underset{\substack{p: C = f(p) \\ x^p: X^p = dg(x^p)}}{\operatorname{argmin}} S, \quad (7)$$

subject to the constraints $CC^H = I$ and $\|x^p\|^2 = \sigma_p^2$, where $p = [p_0 \ldots p_{P-1}]^T$ is a vector stacking pilot subcarrier indices, and the matrix C is a nonlinear function of p given by (2).

Both the equation (5) and the constraints forming the minimisation condition (7) are clearly of the nonlinear type, which is stipulated by the quadratic forms and the inverse matrix terms. No trivial solution exists in general if trying to optimise pilot location (p) and power and phase distribution ($x^p$) jointly. For a particular case of N being multiple of P, $R_{ww} = \sigma_v^2 N^{-1} I$, and the non-restricted pilot subcarrier placement in the band, the ideal pilot pattern solution has been shown to be equi-spaced and equi-powered. The search for the solution of (7) under the general conditions, however, motivates development of suboptimal methods.

This invention proposes a sequential approach during which the sum of square errors minimisation procedure is split into three stages. Despite being suboptimal, this approach has its own benefits allowing introduction of additional constraints, stipulated by practical considerations, at the individual stages. The proposed adaptive pilot pattern optimisation procedure is summarised in the following logical order. First, placement of equally powered and constant-phase pilot symbols is addressed to minimise the sum of square errors function (6), i.e. determining matrix C. At this stage it is possible to ensure that no pilot subcarriers fall into deactivated sub-bands that may be reserved for the primary spectrum users in dynamic spectrum access systems. It will also be shown that the proper pilot subcarrier placement reduces the peak-to-average power ratio (PAR) when it comes to the optimal pilot pattern power loading. Second, based on the determined pilot locations, the relative power distribution between the pilot symbols ($X^p$) is computed to minimise the constrained sum of square errors function (6). For the particular typical case of a diagonal interference covariance matrix ($R_{\xi\xi}$), optimal pilot phase information can be arbitrary; hence the problem is narrowed down to only optimal selection of the pilot symbol magnitudes. Finally, based on the determined pilot locations and the relative power distribution between the pilot symbols ($x^p$), the phase of each pilot symbol is computed to minimise the constrained sum of square errors function (6).

It should be noted that the selected order of the pilot pattern adaptation stages is also stipulated by restriction of the search space to a finite set of possible combinations in the discrete-type pilot positioning problem. This is in contrast to the continuous-type problems of pilot magnitude and phase optimisation, which are characterised by the infinite candidate solutions space.

Step 2a: Determining the Pilot Subcarrier Placement

The inverse of (5) can be decomposed into simpler terms if P=L, i.e. the number of subcarriers assigned for the pilot transmission is equal to the length of the channel impulse response vector. Then, $$S = (CFB)^{-1} X^{p-1} CR_{ww} C^H X^{p-H} (CFB)^{-H}. \tag{8}$$

Setting the number of pilot subcarriers to be equal to the minimum allowed by the channel estimator design (P=L) is reasonable as this has been found to maximise the average ergodic transmission capacity. Hence the number of pilot subcarriers can be confined to this selected pilot pattern dimension.

To construct the objective function for the suboptimal pilot placement, (8) needs to be modified to exclude the $X^p$ term from consideration. Note that if the interference plus white Gaussian Noise covariance matrix $R_{ww}$ is diagonal, $X^{p-1} CR_{ww} C^H X^{p-H} = (X^{pH} X^p)^{-1} CR_{ww} C^H$ in (8) and phase information of $X^p$ elements does not influence the value taken by S. Hence at the first optimisation stage we can constrain the interference-plus-WGN covariance matrix $R_{ww}$ to be diagonal, i.e. use $\bar{R}_{ww} = R_{ww} \circ I_{N \times N}$ (where $\circ$ denotes element-wise matrix product) instead of $R_{ww}$ in (8) to solve for C.

It is also known that in the absence of interference, pilot subcarriers should be assigned equal power to yield the optimum estimation performance, subject to equal spacing in the band. Additionally, from a good waveform characteristics standpoint, equally powered pilot symbols maintain peak-to-average power ratio equal to unity in the frequency domain and alleviate peak-to-average power ratio reduction in the time domain (after inverse DFT), achieved by selection of the appropriate pilot phase combinations. Hence the invention adopts, in the initial step of determining the pilot subcarrier placement, an equally powered pilot pattern with a constant phase of $\theta_0$, $\bar{X}^p = \sigma_p N^{-1/2} e^{j\theta_0} I$, for the optimisation algorithm. Thus, the objective function becomes:

$$\bar{S} = tr\left[(CFB)^{-1} (\bar{X}^{pH} \bar{X}^p)^{-1} C\bar{R}_{ww} C^H (CFB)^{-H}\right] \tag{9}$$
$$= \sigma_p^{-2} N tr\left[(CFB)^{-1} C\bar{R}_{ww} C^H (CFB)^{-H}\right].$$

Hence the pilot positioning can be determined as the solution of $$p_{subopt} = \underset{p: C = f(p), CC^H = I}{\operatorname{argmin}} \sigma_p^2 N^{-1} \bar{S}. \tag{10}$$

The nonlinear terms of (9) and (10) make it impossible to deduce the closed-form solution. The exhaustive search of all possible pilot locations is prohibitively complex, especially for a larger number of pilot subcarriers, as there are $C_L^N = N!/[L!(N-L)!]$ possible combinations. Instead, the invention applies a suboptimal algorithm of the successive search for the pilot candidates, involving a single pilot update per iteration. The initialisation conditions for the algorithm are determined by the cyclic shift of the equally spaced (ES) pilot pattern to yield the least sum of square errors (LSSE) fit to the interference-plus-noise power spectral density (PSD), $\bar{R}_{ww}$.

Let the non-shifted equally spaced (or the approximately equally spaced if N is not multiple of L) pilot pattern be described as $$p_{esk} = \begin{cases} p_{esk-1} + \Delta + 1 & \text{if } k < N - L\Delta \\ p_{esk-1} + \Delta & \text{otherwise} \end{cases}, k \in \{1, \ldots, L-1\}, \tag{11}$$

where $p_{es0} = 0$ and $\Delta = \lfloor NL^{-1} \rfloor$ (here $\lfloor \cdot \rfloor$ denotes rounding to the smaller integer). Then the vector of indices of the cyclically shifted equally spaced pilot pattern can be expressed as $$\bar{p} = p_{es} + \eta 1_{L \times 1} \tag{12}$$

where $p_{es} = [p_{es0} \ldots p_{esL-1}]^T$, 1 is the vector of all ones, and the cyclic shift size is selected from the range $\eta \in \{0, \ldots, \Delta-1\}$.

The least sum of square errors equally spaced pilot pattern $p_{lsse-es} = p_{es} + \eta_{opt} 1$ is found to satisfy $$\eta_{opt} = \underset{\substack{\eta: \bar{C} = f(p_{es} + \eta 1) \\ \eta \in [0, \Delta-1]}}{\operatorname{argmin}} tr\left[(\bar{C}FB)^{-1} C\bar{R}_{ww} \bar{C}^H (\bar{C}FB)^{-H}\right], \tag{13}$$

where the search is performed over $\Delta$ pilot pattern variants, each corresponding to a distinct $\eta$ value.

Once the initialisation stage is completed and the best equally spaced pilot sequence is found, the algorithm starts iterations to update location of each pilot subcarrier so as to yield minimum sum of square errors of channel estimation.

Let the L×N matrix $\tilde{C}$ and the N×L matrix B be partitioned as $\tilde{C} = [\check{C}^T c]^T$ and $B = [\check{B} b]$, where c specifies candidate location of the (L−1)th pilot subcarrier. Then $$\tilde{C}FB = \begin{bmatrix} \check{C}^T & c \end{bmatrix}^T \begin{bmatrix} \check{F}B & Fb \end{bmatrix} = \begin{bmatrix} \check{C}F\check{B} & \check{C}Fb \\ c^T F\check{B} & c^T Fb \end{bmatrix} = \begin{bmatrix} A & f \\ g^H & a \end{bmatrix}. \tag{14}$$

According to the definition of the partitioned matrix inverse, $$(\tilde{C}FB)^{-1} = \begin{bmatrix} (I_{(L-1)\times(L-1)} + \beta a g^H)A^{-1} & -\beta a \\ -\beta g^H A^{-1} & \beta \end{bmatrix}, \quad (15)$$

where $a = A^{-1}f$ and $\beta = (\alpha - g^H a)^{-1}$.

The normalised sum of square errors metric for the candidate location comparison can be subsequently computed as $$\rho = tr\left[(\tilde{C}FB)^{-1}\tilde{C}\bar{R}_{ww}\tilde{C}^H(\tilde{C}FB)^{-H}\right] \quad (16)$$

$$= \sum_{k=0}^{L-2}\left[\bar{C}\bar{R}_{ww}\tilde{C}^T\right]_{k,k}\left\|((\tilde{C}FB)^{-1})_k\right\|^2 + c^T\bar{R}_{ww}c\left\|((\tilde{C}FB)^{-1})_{L-1}\right\|^2,$$

where $(\cdot)_k$ denotes kth column of the matrix and $[\cdot]_{k,k}$ is the kth diagonal element of the matrix.

The successive search algorithm used in the invention updates the selector matrix $\tilde{C}$ before each iteration by assigning the pilot location affected by the maximum interference power to form the last row of $\tilde{C}$. The algorithm is described as follows.

---

Initialisation: $\tilde{p} := p_{lsse-es}$, $\tilde{C} := f(p_{lsse-es})$, $\psi := 1_{N\times 1}$
For m = 1 to L do a) $\tilde{k} := \underset{k\in[0,L-1]}{\mathrm{argmax}}\left[\tilde{C}dg(\psi)\bar{R}_{ww}\tilde{C}^T\right]_{k,k}$ b) $\mu := \tilde{p}_{\tilde{k}}$
c) $\tilde{p}_{\tilde{k}} := p_{L-1}$
d) $p_{L-1} := \mu$
e) $\tilde{C} := f(\tilde{p})$
f) $\bar{C} := I_{(L-1)\times L}\tilde{C}$
g) $A := \bar{C}F\bar{B}$
h) $a := A^{-1}\bar{C}Fb$
i) For n = 0 to N-1 ($n \notin I_{(L-1)\times L}\tilde{p}$) do
  i.1) $c := 0_{N\times 1}$, $c_n := 1$
  i.2) $g := (F\bar{B})^H c$
  i.3) $a := c^T Fb$
  i.4) $\beta := (\alpha - g^H a)^{-1}$ i.5) $Z := \begin{bmatrix} (I_{(L-1)\times(L-1)} + \beta a g^H)A^{-1} & -\beta a \\ -\beta g^H A^{-1} & \beta \end{bmatrix}$ i.6) $\rho_n := \sum_{k=0}^{L-2}\left[\bar{C}\bar{R}_{ww}\tilde{C}^T\right]_{k,k}\|(Z)_k\|^2 + c^T\bar{R}_{ww}c\|(Z)_{L-1}\|^2$ End for.

j) $\tilde{p}_{L-1} := \underset{\substack{n\in[0,N-1]\\ n\notin I_{(L-1)\times L}\tilde{p}}}{\mathrm{argmin}} \zeta_n \rho_n$ k) $\tilde{C} := f(\tilde{p})$
l) $\psi_{\tilde{p}L-1} := 0$
End for.

$p_{adapt} = \tilde{p}$

---

Here $\psi = [\psi_0 \ldots \psi_{N-1}]^T$ represents the mapping vector used to exclude processed location indices from the search space. The set of the weight coefficients $\zeta_n$ is needed to mark deactivated (virtual) subcarriers, to which neither pilot nor data symbols may be assigned. If all subcarriers are active, $\zeta_n = 1$, $\forall n \in \{0, \ldots, N-1\}$, otherwise $\zeta_n = \infty$ for the nth subcarrier, which is set inactive.

The matrix partitioning method limits the number of inverse computations to one per iteration instead of (N−L−1) to encompass all pilot candidate locations (one inversion per candidate). Nevertheless, it should be noted that the complexity of this and subsequently presented algorithms is not a critical concern as the computation needs to be performed offline before the communication session begins which can be achieved by ordinary software. All the algorithmic calculations are done at the receiver, and the resultant pilot pattern parameters are signalled to the transmitter. Since the number of pilot subcarriers is far fewer than the total number of subcarriers in the band, this side information does not induce noticeable redundancy into the transmissions.

The suboptimal pilot positioning described above takes into account only interference covariance at the receiver side, which is sufficient for the channel estimation sum of square errors minimisation. In cognitive radio applications in which dynamic spectrum access is employed, the transmit conditions also impose restrictions on the pilot pattern structure, as the multicarrier system implementing dynamic spectrum access must not interfere with the primary band users. This includes mandatory deactivation of the subcarriers overlapping with the primary user spectra as well as of the adjacent subcarriers to form the guard intervals. It is very easy to incorporate these transmit constraints into the proposed pilot pattern adaptation by simply regarding the overlapping subcarriers as virtual with $\zeta_n = \infty$ (this will be shown by a numerical example below with reference to FIG. 3). Thus, the transmitter should send the virtual subcarrier location information to the receiver before the adapted pilot pattern can be computed and fed back.

Step 2b: Determining the Optimal Power Loading for the Pilot Symbols

One of the factors stipulating sub-optimality of the pilot subcarrier placement during Step 1 is the restriction of the equal power distribution for different pilot subcarriers. In contrast to the pilot placement problem, which is characterised by the finite, though excessively large discrete candidate solution space, optimal adjustment of the pilot symbol magnitudes is regarded as a continuous sum of square errors minimisation problem. Hence it is straightforward to see the logic behind an approach separating solutions of these two problems. At the second stage of the power pattern adaptation the optimal power distribution is determined for the pilot subcarrier placement fixed during the first stage, assuming a non-correlated interference environment, i.e. adopting a diagonal $\bar{R}_{ww}$ similar to the preceding subsection.

Let the pilot subcarrier locations be specified in the vector p, which defines the selector matrix $C = f(p)$. Pilot power optimisation boils down to the solution of $$x^p_{opt} = \underset{x^p: x^p = dg(x^p)}{\mathrm{argmin}} \bar{\bar{S}}, \quad (17)$$

subject to the only constraint $\|x^p\|^2 = \sigma_p^2$. Here $$\bar{\bar{S}} = tr\left[(CFB)^{-1}X^{p-1}C\bar{R}_{ww}C^H X^{p-H}(CFB)^{-H}\right] \quad (18)$$

$$= tr\left[(CFBB^H F^H C^H)^{-1}X^{p-1}C\bar{R}_{ww}C^H X^{p-H}\right]$$

$$= z^H \bar{R} z,$$

$z = [x_{p_0}^{-1} \ldots x_{p_{L-1}}^{-1}]^T$, $\bar{R} = (CFBB^H F^H C^H)^{-1} \circ (C\bar{R}_{ww}C^H)^*$, and $(\cdot)^*$ denotes the complex conjugate.

Let $Q = dg(z)^H dg(z)$ so that $tr(Q^{-1}) = \sigma_p^2$ and $\bar{\bar{S}} = tr(Q\bar{R})$, then one can use the trace version of the Cauchy-Schwarz inequality to show that $\bar{\bar{S}} tr(Q^{-1}) \geq [tr(\bar{R}^{1/2}Q^{1/2}Q^{-1/2})]^2$, where the equality takes place if and only if $Q^{-1} = \gamma^2 QR$. Hence $$\bar{\bar{S}} \geq \sigma_p^{-2} [tr(\bar{R}^{1/2})]^2 \qquad (19)$$

with the equality only when $Q^{-1} = \gamma \bar{R}^{1/2}$ and $\gamma = 1/tr(\bar{R}^{1/2})$. Hence $$x_{opt}^P = [tr(\bar{R}^{1/2})]^{-1/2} \bar{R}^{1/4} 1_{L \times 1} e^{j\theta_0} \qquad (20)$$

where the phase of the pilot symbols is specified to be constant as it does not affect channel estimation sum of square errors.

Step 2c: Determining the Optimal Pilot Symbol Phase for the Pilot Symbols

From a practical standpoint, interference power spectral density information is sufficient to perform optimisation of the pilot symbol positioning and power distribution. In such a case the interference covariance matrix is regarded as diagonal, and pilot pattern phase assignment does not affect channel estimation sum of square errors and can be reserved for other goals, e.g., peak-to-average power ratio reduction at the transmitter inverse DFT output.

It should be noted that estimation of the entire interference covariance matrix is more complex than estimation of only a diagonal matrix. For the non-diagonal interference covariance matrix, pilot phase optimisation is desirable to minimise channel estimation sum of square errors. Due to the specific requirement of the interference covariance matrix being non-diagonal (otherwise the number of solutions is infinite), the invention proposes that pilot phase optimisation be held at the third stage, after the optimal placement and magnitudes of the pilot symbols have been determined.

Let C and $Q^{-1} = X^{pH} X^p$ denote the optimised pilot placement and power loading matrices, and let $x^P = Q^{-1/2} \exp(j\theta) = Q^{-1/2} \phi^*$ ($\phi = \exp(-j\theta)$), so that one can express $z = Q^{1/2} \phi$. The optimal pilot symbol phases $\theta_{opt}$ are selected to satisfy $$\varphi_{opt} = \underset{\varphi : dg(\varphi)^H dg(\varphi) = 1}{\operatorname{argmin}} \bar{\bar{S}}, \qquad (21)$$

where $$\bar{\bar{S}} = z^H R z = \varphi^H Q^{1/2} R Q^{1/2} \varphi = L(\varphi^H \varphi)^{-1} \varphi^H Q^{1/2} R Q^{1/2} \varphi \qquad (22)$$

and $$R = (CFBB^H F^H C^H)^{-1} \circ (CR_{ww} C^H)^*. \qquad (23)$$

According to the Rayleigh-Ritz theorem (bounds of Raileigh quotient), $$(\phi^H \phi)^{-1} \phi^H Q^{1/2} R Q^{1/2} \phi \geq d_{min}, \qquad (24)$$

where $d_{min}$ is the minimum eigenvalue of $Q^{1/2} R Q^{1/2}$. The equality in (24) takes place if and only if $\phi$ is the scaled eigenvector corresponding to $d_{min}$.

In general, the minimum of $\bar{\bar{S}} = L d_{min}$ cannot be attained due to the constant modulus constraint $dg(\phi)^H dg(\phi) = I$. To produce the solution (21), a successive determination of $\phi_{opt}$ elements is done. Let the eigenvalue decomposition of $Q^{1/2} R Q^{1/2}$ yield $Q^{1/2} R Q^{1/2} = UDU^H$, where the diagonal elements of D (eigenvalues) are arranged in the descending order. Then the optimum pilot symbol phases can be computed by sequentially solving $$\theta_{opt} = \underset{\theta \in (-\pi, \pi)}{\operatorname{argmin}} \| V \exp(\theta) - d \|^2, \qquad (25)$$

where $L^{-1} UDU^H = (L^{-1/2} D^{1/2} U^H)^H L^{-1/2} D^{1/2} U^H = V^H V$ and $d = [0 \ldots 0 d_{min}^{1/2}]^T$. The proposed algorithm is identical to the well-known successive interference cancellation procedure (which is an optimal technique by itself) and is described as follows.

---

Initialisation: $\tilde{V} := L^{-1/2} D^{1/2} U^H$, $\tilde{d} := d$
For m = 0 to L−1 do
 a) $\tilde{\phi} := \tilde{V}^+ \tilde{d}$
 b) $\tilde{\psi} := 1_{L \times 1} - \tilde{\phi} \circ \tilde{\phi}^*$
 c) $k_m := \underset{\substack{n \in [0, L-1] \\ n \neq k_l, l \in [0, m)}}{\operatorname{argmin}} \tilde{\psi}_n^2$
 d) $\theta_{k_m} := -\arctan(\Im \tilde{\phi}_{k_m} / \Re \tilde{\phi}_{k_m})$
 e) $\tilde{d} := \tilde{d} - (\tilde{V})_{k_m} \exp(-j\theta_{k_m})$
 f) $(\tilde{V})_{k_m} := 0$
End for.
$\theta_{opt} = [\theta_0 \ldots \theta_{L-1}]^T$

---

Here $\Re$ and $\Im$ denote the real and imaginary parts respectively. The order of pilot phase identification is governed by how close to unity each element's modulus in the phase vector $\tilde{\phi}$ is at a given iteration.

Numerical Analysis and Results

A numerical simulation and analysis was conducted to evaluate the efficiency of the three-stage pilot pattern adaptation technique of the invention against a non-adapted pilot pattern (i.e., the centred equally spaced pilot pattern with equally powered pilot subcarriers) and partially adapted pilot patterns (e.g., least sum of square errors equally spaced pilot pattern with optimised pilot power). Two comparative metrics were considered: channel estimation sum of square errors and frequency-domain peak-to-average power ratio.

a) System Configuration

The numerical simulation used a discrete-time fully synchronised baseband multicarrier system with the processing block length (DFT size) of N=64. The number of pilot subcarriers is equal to the channel impulse response length, i.e. P=L. Channel impulse response is assumed invariant over a single block interval.

For the selected pilot placement vector p and pilot symbol values $x^P$, channel estimation sum of square errors is calculated analytically using equations (5)-(6). Different pilot patterns are compared by substitution of the corresponding parameters $C = f(p)$ and $X^P = dg(x^P)$ into (5).

Sum of square errors performance computed using (5)-(6) depends on the interference plus white Gaussian noise covariance matrix $R_{ww}$, more specifically on the underlying interference covariance matrix $R_{\xi\xi}$ and the white Gaussian noise variance $\sigma_v^2$. On the other hand, sum of square errors depends on the pilot symbol power. In the numerical simulation, sum of square errors was evaluated as a function of the ratio between the total power $\sigma_p^2$, assigned to the pilot symbols in a single block, and the total in-band interference power, $\sigma_\xi^2$, and white Gaussian noise power $\sigma_v^2$, i.e. a signal-to-interference power ratio of $SIR = \sigma_p^2 / \phi_\xi^2$ and a signal-to-noise power ratio of $SNR = \sigma_p^2 / \sigma_v^2$.

Since what is of interest is the comparative performance level achieved by employing different pilot patterns, there is no need to use a highly realistic interference model. It is quite reasonable to assume that interference represents a sum of J statistically independent narrowband stochastic processes, called "interferers". The elements of the frequency correlation coefficient matrix of each individual interferer can be modelled as $$[\Omega]_{m,n} = q^{|m-n|}, m, n \in \{0, \ldots, N-1\}, \qquad (26)$$

where $q \in [0, 1)$ is the cross-correlation parameter, and power spectral density $s^{(i)} = [s_0^{(i)} \ldots s_{N-1}^{(i)}]^T$, $i \in \{0, \ldots, J-1\}$ can be assumed to have a Gaussian shape:

$$s_n^{(i)} = c_\Sigma \sigma_\xi^2 A_i \exp\left(-\frac{4\ln\bar{\gamma}^{-1}}{W_i^2}(n-u_i)^2\right), n \in \{0, \ldots, N-1\}. \quad (27)$$

where $A_i$ is the relative power gain of the ith interferer, $W_i$ is the ith interferer bandwidth at the level $\bar{\gamma}$ (we specify bandwidth at the 0.5 level), expressed as the number of subcarrier spacings, $v_i$ is the ith interferer's central frequency index, and the normalisation coefficient $c_\Sigma$ is selected to ensure that $$\sum_{i=0}^{J-1}\sum_{n=0}^{N-1} s_n^{(i)} = \sigma_\xi^2.$$

Here $k_i$ and $W_i$ can be non-integer in general.

The covariance matrix of a mixture of J independent interferer processes is expressed as $$R_{\xi\xi} = \sum_{i=0}^{J-1} \mathrm{dg}(s^{(i)})^{1/2} \Omega \mathrm{dg}(s^{(i)})^{1/2}. \quad (28)$$

b) Statistical Performance Evaluation

The efficiency of the proposed pilot pattern adaptation technique was evaluated against a variety of interference-plus-WGN covariance matrices. A typical experiment involves analytical computation of the channel estimation sum of square errors by (5)-(6), averaged over 1000 random $R_{\xi\xi}$ realisations.

Figure 2:
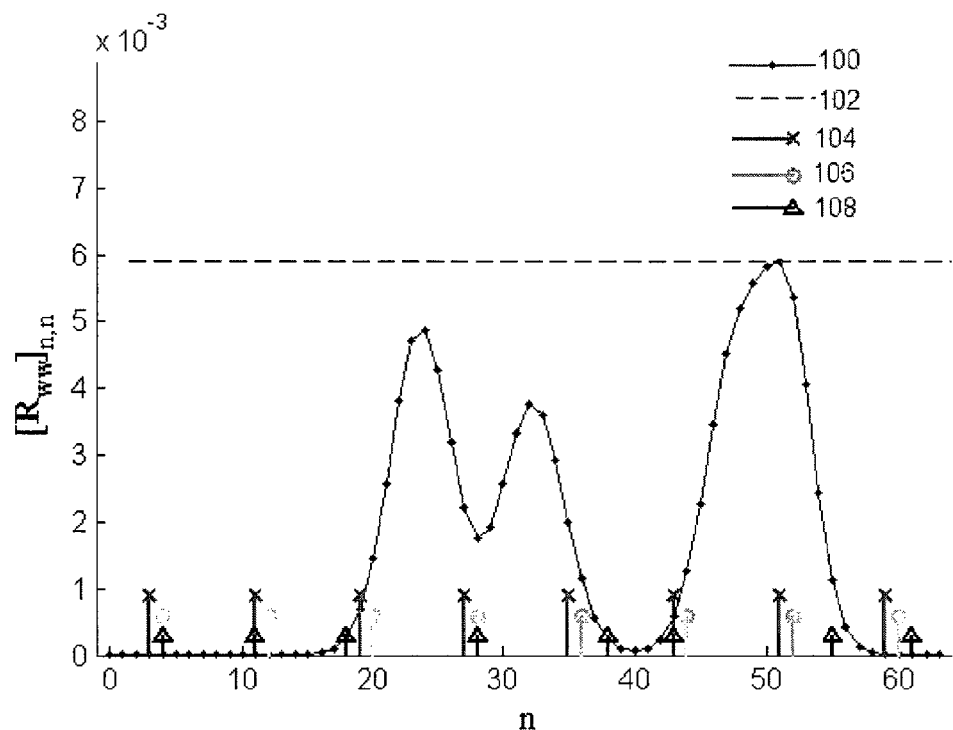
FIG. 2 is a graph showing interference-plus-noise power spectral density across a range of frequencies indicated by a number of subcarrier indexes (n), for different pilot placement schemes.

FIG. 2 shows a graph of an example of the interference-plus-noise power spectral density (100) across a range of frequencies indicated by a number of subcarrier indexes (n). The interference-plus-noise power spectral density (100) varies as a result of white Gaussian noise and in-band interference as previously explained. In FIG. 2, the dotted line (102) indicates that all 64 subcarriers are available for use in signal transmission. The centred equally spaced pilot pattern is indicated at (104) and least sum of square errors equally spaced pilot pattern indicated at (106). As can be seen, both of these pilot patterns are equally spaced irrespective of the level of interference-plus-noise (100). The adaptive pilot pattern of the invention is indicated at (108). As can be seen, the pilot symbols determined according to the method of the invention are not equally spaced, but are adapted to avoid subcarriers in which the interference-plus-noise (100) is high. In this example, the adaptive pilot pattern locations for (108) are at subcarriers 4, 11, 18, 28, 38, 43, 55 and 61.

Figure 3:
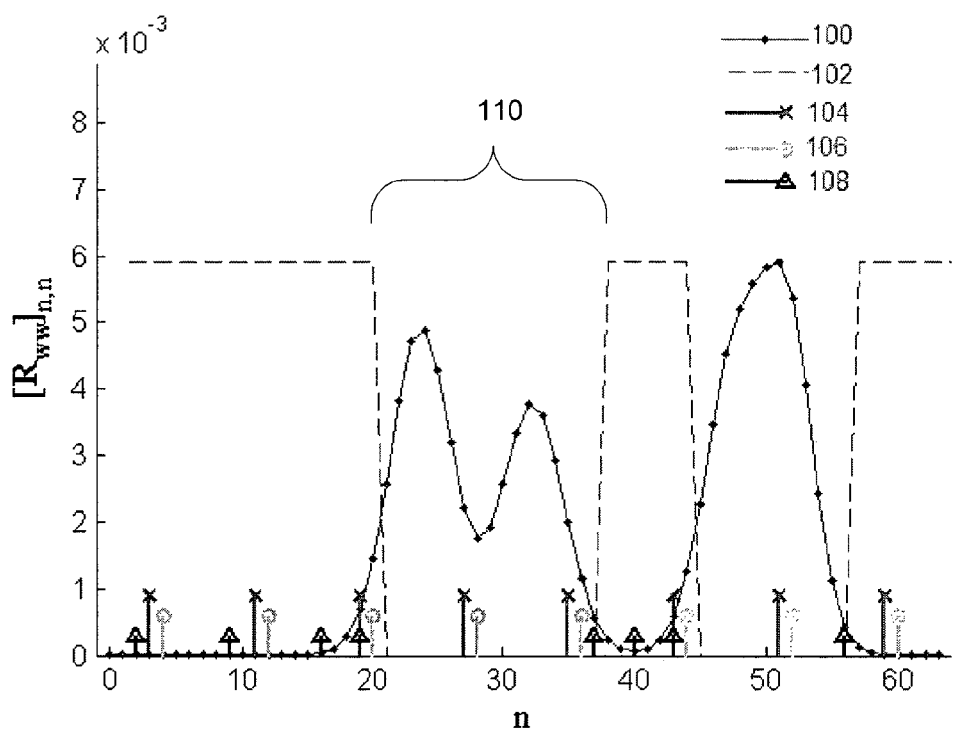
FIG. 3 is similar to FIG. 2 but has certain subcarriers deactivated.

FIG. 3 is similar to FIG. 2 except that certain subcarriers indicated by (102) have been deactivated, which may be the case in dynamic spectrum access systems where primary (licensed) bands must be avoided by the transmitter. In this example a subcarrier is set as deactivated if the interference-plus-noise power spectral density (100) exceeds 0.01($\sigma_\xi^2$+$\sigma_v^2$). Numeral (110) shows a zone in which subcarriers have been deactivated. As seen in FIG. 3, while the centred equally spaced pilot pattern (104) and least sum of square errors equally spaced pilot pattern (106) are unaffected by the deactivation of certain subcarriers and therefore are unsuitable for such a communication scenario, deactivation of a number of subcarriers in the band yields a totally different optimised pilot pattern (108), with pilot symbols now located at 2, 9, 16, 19, 37, 40, 43 and 56. The minimal channel estimation sum of square errors achieved with the deactivated subcarriers is increased, and in this example is 0.018 for the pilot pattern (108) of FIG. 3 versus 0.005 FIG. 2 for a signal-to-interference power ratio of SIR=10 dB and a signal-to-noise power ratio of SNR=30 dB.

Statistical simulations were conducted to establish how the parameters underlying the interference-plus-WGN covariance matrix $R_{ww}$, namely the number and bandwidth of interferers, influence channel estimation sum of square errors in the case of the three different pilot placement schemes. The channel impulse response length was set equal to L=8 samples, the signal-to-interference power ratio was set at SIR=10 dB, signal-to-noise power ratio at SNR=30 dB, the interferer correlation coefficient matrix was modelled as diagonal, i.e. q=0 in (26), and pilot power optimisation was not employed. In all the subsequent simulation results the system was assumed to have no virtual subcarriers, i.e. all subcarriers are active as in FIG. 2.

Figure 4:
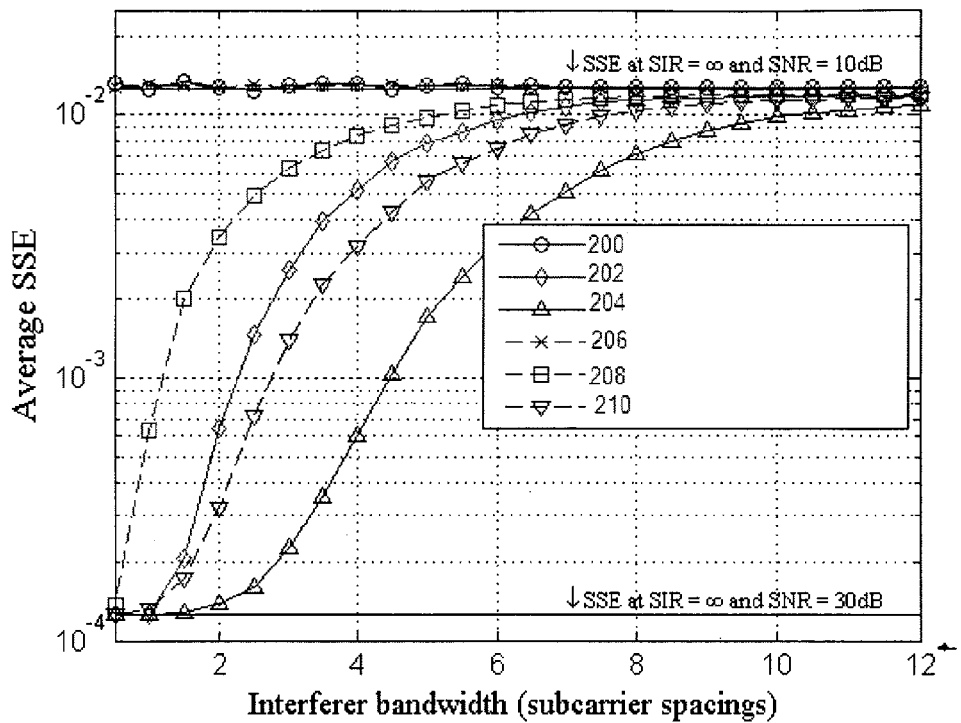
FIG. 4 is a graph showing the impact of interferer bandwidth on the average channel estimation sum of square errors for different pilot placement schemes.

FIG. 4 illustrates the impact of the interferer bandwidth on the average channel estimation sum of square errors (SSE) for each of the pilot placement schemes. In FIG. 4, each interferer has a fixed bandwidth, $W_i=W_0$, $\forall i\in[0, J-1]$, specified in the horizontal axis, and the relative power gain $(A_i)$ and the central frequency $(v_i)$ of interferers are random and uniformly distributed in the continuous intervals [0,1] and [0, N-1] respectively, to create a more realistic interference representation. Increasing interferer bandwidth makes $R_{\xi\xi}$ approach a scaled identity form, which is inherent to white Gaussian noise, hence one can see the asymptotic trend near sum of square errors corresponding to SNR=10 dB which represents the worst case—flat interference power spectral density. In case of the narrowband interferers (e.g. interferers with a bandwidth of less than 6 times the subcarrier spacing), the average sum of square errors resulting from the different pilot patterns varies greatly.

Numerals (200) and (206) show the average channel estimation SSE for the fixed (centred) equally spaced pilot pattern with 2 interferers and 6 interferers respectively. The fixed (centred) equally spaced pilot pattern is the one adopted in most multicarrier systems. Clearly, this pilot pattern is not suitable for cognitive radio applications as the presence of only a few strong narrowband interferers leads to dramatic degradation of the channel estimation performance, with an average sum of square errors of $10^{-2}$ even where the interferer bandwidth is less than 2 subcarrier spacings.

Numerals (202) and (208) show the average channel estimation SSE for the least sum of square errors equally spaced pilot pattern with 2 and 6 interferers respectively. Clearly, this arrangement is preferable to the fixed (centred) equally spaced pilot pattern. Numerals (204) and (210) show the average channel estimation SSE for the adaptive pilot placement of the invention with 2 and 6 interferers respectively. As can be seen, the adaptive pilot placement results in the lowest average sum of square errors for a given number of interferers, especially in the case of larger number of narrowband interferers. When the interferer bandwidth is about 2-4 subcarriers, the channel estimation SSE difference between the least sum of square errors equally spaced pilot pattern (202, 208) and the adaptive pilot pattern of the invention (204, 210) reaches an order of magnitude.

Figure 5:
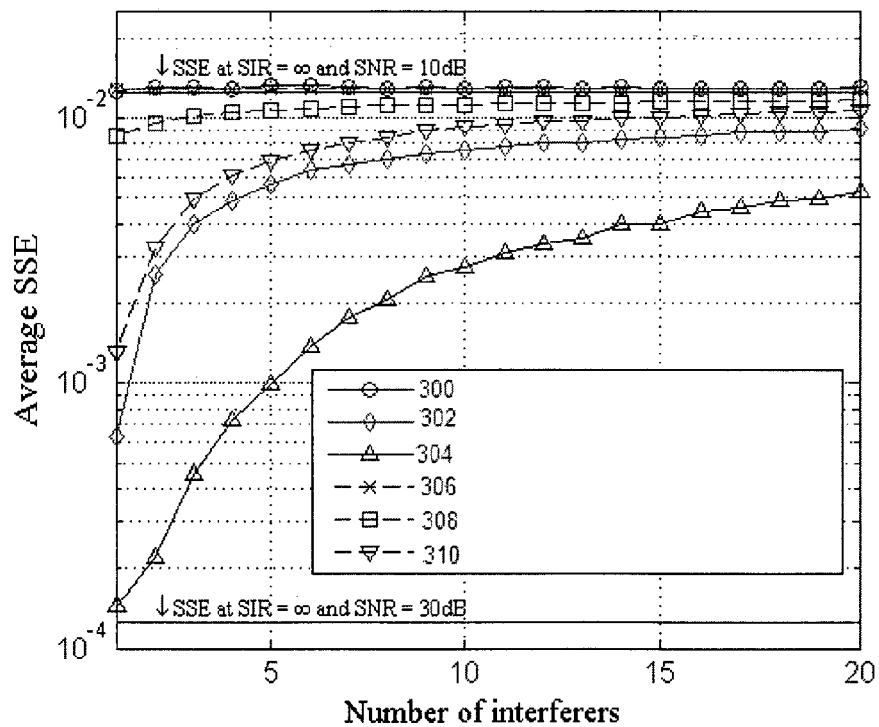
FIG. 5 is a graph showing the impact of the number of interferers on the average channel estimation sum of square errors for different pilot placement schemes.

FIG. 5 illustrates the impact of the number of interferers on the average channel estimation sum of square errors for each of the three pilot placement schemes. Numerals (300) and (306) show the average channel estimation SSE for the fixed (centred) equally spaced pilot pattern with an interference bandwidth of 3 and 6 subcarrier spacings respectively, numerals (302) and (308) show the average channel estimation SSE for the least sum of square errors equally spaced pilot pattern with an interference bandwidth of 3 and 6 subcarrier spacings respectively, and numerals (304) and (310) show the average channel estimation SSE for the adaptive pilot pattern of the invention with 3 and 6 subcarrier spacings respectively. As can be seen, the adaptive pilot pattern of the invention results in much lower average channel estimation SSE, especially in the case of a small number of interferers which is a likely real-world scenario.

Next, statistical simulations were conducted to determine the impact of the number of pilot subcarriers on the average channel estimation sum of square errors (SSE) for each of the three pilot placement schemes. The simulation was done using 2 or 6 interferers having a random bandwidth being uniformly distributed in the interval from 0.5 to 8 subcarrier spacings. The other interference and WGN parameters are the same as in the preceding simulations.

Figure 6:
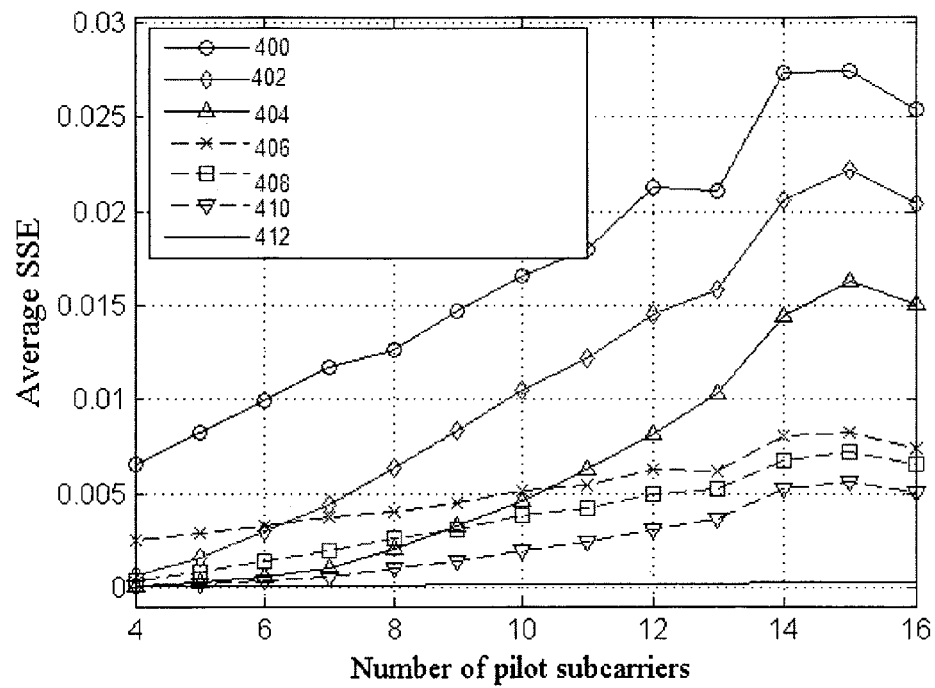
FIG. 6 is a graph showing the impact of the number of pilot subcarriers on the average channel estimation sum of square errors for different pilot placement and pilot power distribution schemes.

The results are shown in FIG. 6. Numerals (400) and (406) show the average channel estimation SSE for the fixed (centred) equally spaced pilot placement with equally powered and power-optimised pilot symbols respectively, numerals (402) and (408) show the average channel estimation SSE for least sum of square errors equally spaced pilot placement with equally powered and power-optimised pilot symbols respectively, and numerals (404) and (410) show the average channel estimation SSE for the adaptive pilot placement of the invention with equally powered and power-optimised pilot symbols respectively. Numeral (412) shows the average channel estimation SSE for a signal-to-interference power ratio of SIR=∞ and signal-to-noise power ratio of SNR=30 dB. The growing sum of square errors trend in FIG. 6 is explained by the design requirement of P=L, i.e. the longer (more complicated) channel impulse response models lead to a higher channel estimation sum of square errors, which cannot be fully compensated by the increased number of pilot subcarriers because the total power shared by them remains constant. Note however that this growth is linear and is almost imperceptible in FIG. 6 for the interference-free scenario (SIR=∞). If interference is present, the superiority of the performance of the power-optimised pilot patterns (406, 408 and 410) is evident, especially for longer channel impulse responses (i.e. higher numbers of pilots). The sum of square errors reduction is more significant for the non-adapted pilot patterns that highlight a considerable part of the optimisation effort achieved by the pilot positioning method of the invention.

Figure 7:
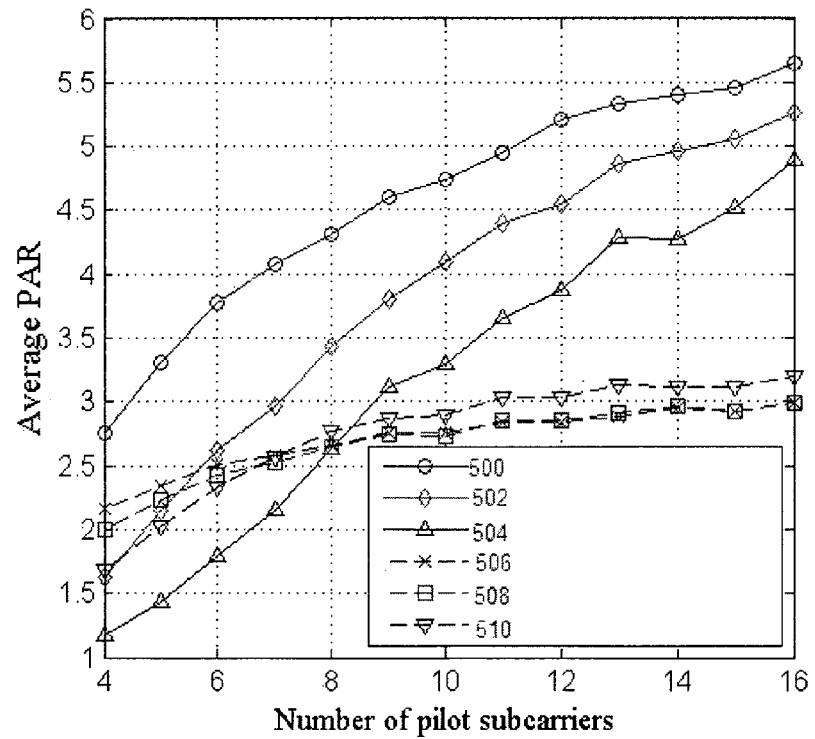
FIG. 7 is a graph showing peak-to-average power ratio in the frequency domain for different pilot placement and pilot power distribution schemes.

Statistical simulations were also conducted to determine the peak-to-average power ratio (PAR) of the three pilot placement schemes and the results are shown in FIG. 7. Numerals (500) and (506) show the peak-to-average power ratio for the fixed (centred) equally spaced pilot pattern with 2 interferers and 6 interferers respectively, numerals (502) and (508) show the peak-to-average power ratio for the least sum of square errors equally spaced pilot pattern with 2 and 6 interferers respectively, and numerals (504) and (510) show the peak-to-average power ratio for the adaptive pilot pattern of the invention with 2 and 6 interferers respectively. It will be seen that the adaptive pilot pattern of the invention substantially reduces peak-to-average power ratio of the power-optimised pilot sequence in the frequency domain. This will also be the case in the time domain if peak-to-average power ratio is not compensated using the pilot phase information.

Lastly, it is of interest to assess the pilot phase optimisation effect. Since pilot phase information can be utilised for optimisation only when $R_{\xi\xi}$ is non-diagonal, a range of values for the cross-correlation parameter q in (26) is defined. The channel impulse response length is set to be equal to 8 samples. The other settings are the same as in the preceding simulation.

Figure 8:
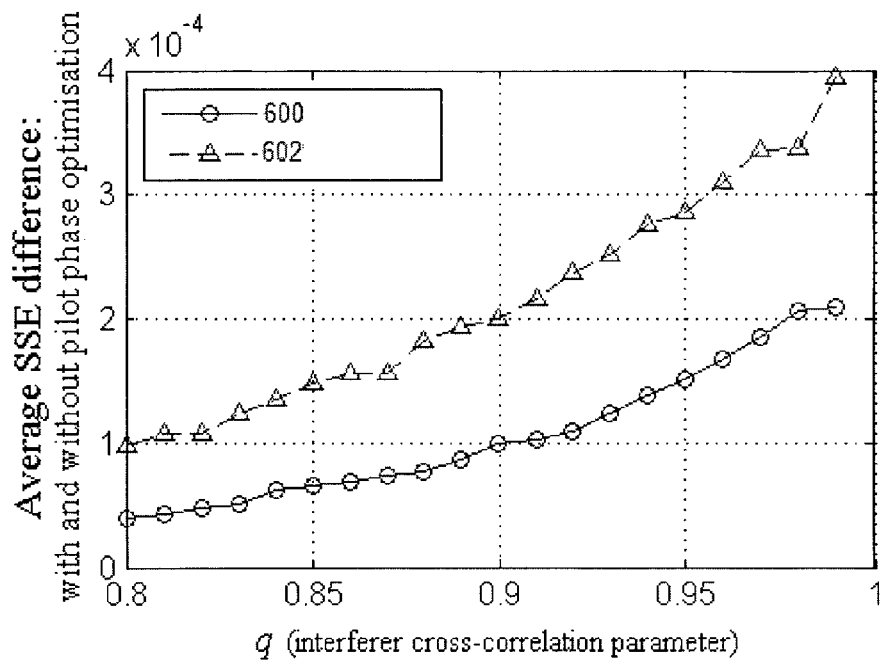
FIG. 8 is a graph showing the impact of interferer correlation properties and pilot symbol phases on the average channel estimation sum of square errors for the optimised placement and power distribution of the pilot symbols.

FIG. 8 shows a graph of how the difference between the average channel estimation SSE with and without pilot phase optimisation changes with a change in the interferer cross-correlation parameter q, for 2 interferers (600) and for 6 interferers (602). FIG. 8 shows that the pilot symbol phase optimisation algorithm allows some improvement in the channel estimation SSE in the case of highly correlated interferer models with higher q values. However, for the smaller q values (i.e. less correlated interferer models) the difference between channel estimation SSE, calculated for the pilot pattern with and without phase optimisation, becomes negligible. Hence another option is to utilise pilot phase information for other purposes, e.g., peak-to-average power ratio reduction at the transmitter or synchronisation at the receiver side.

Figure 9:
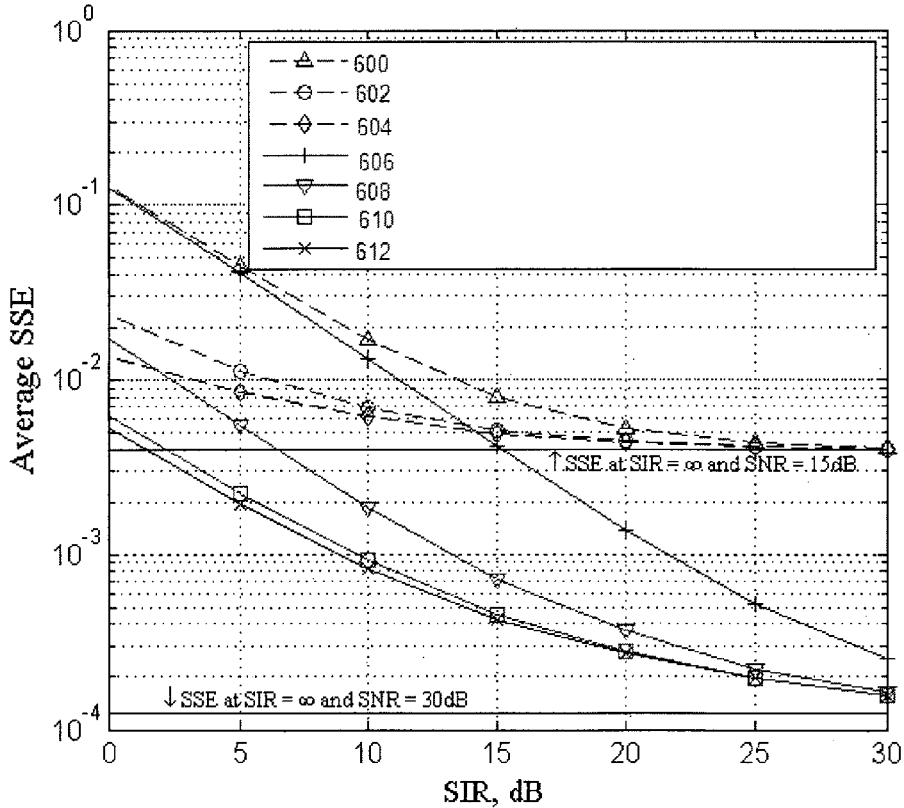
FIG. 9 is a graph showing average channel estimation sum of square errors performance for a variety of pilot placement, power distribution and phase assignment schemes and interference and noise power levels.

Comparative performance assessment results for a variety of pilot patterns are illustrated in FIG. 9, which shows how the average channel estimation SSE varies for each of the pilot patterns based on a change in the signal-to-interference power ratio (SIR). Numerals (600) and (606) show the curves for the fixed (centred) equally spaced pilot pattern with signal-to-noise power ratio (SNR) levels of 15 dB and 30 dB respectively, numeral (602) shows the curve for the adaptive pilot placement of the invention with equally powered pilots symbols and an SNR of 15 dB, numeral (604) shows the curve for the adaptive pilot pattern of the invention with power and phase-optimised pilot symbols and an SNR of 15 dB, numeral (608) shows the curve for the adaptive pilot pattern of the invention with equally powered pilot symbols and an SNR of 30 dB, numeral (610) shows the curve for the adaptive pilot pattern of the invention with power-optimised pilot symbols and an SNR of 30 dB, and numeral (612) shows the curve for the adaptive pilot pattern of the invention with power and phase-optimised pilot symbols and an SNR of 30 dB. It can be seen that the first two pilot pattern optimisation stages (pilot placement and power loading) are sufficient to guarantee much lower sum of square errors than the fixed equally spaced pilot pattern with equal power distribution. Most of the sum of square errors reduction is achieved at the very first stage (pilot placement), emphasising the efficiency of the adaptive pilot placement of the invention. At the same time optimisation of the pilot symbol phases brings only minor performance gain, which stipulates sufficiency of a two-stage optimisation cycle. This conclusion is very important from a practical standpoint as one needs to estimate only power spectral density and not the entire interference covariance matrix in order to proceed with pilot pattern optimisation.

The model used in this description incorporates realistic conditions: constraint of the total power dedicated to all pilot symbols; the possibility of specifying any number of arbitrarily positioned subcarriers as unavailable for transmission in the process of the pilot pattern computation; and the presence of two or more interferers in the channel environment characterised by arbitrary power magnitudes.

The invention therefore provides a method for improving the channel estimation performance in a dynamic spectrum access multicarrier system which adaptively optimises the pilot pattern in response to the channel estimation properties. The pilot pattern of the invention leads to a lower average sum of square errors of the channel estimation over a range of interferer bandwidths and numbers of interferers, and a lower peak-to-average power ratio that existing pilot patterns. The method of the invention is suitable for use in cognitive radio applications in which certain sub-bands must be deactivated.

The invention claimed is:

1. A method for improving channel estimation performance in a dynamic spectrum access multicarrier system that utilizes a pattern of pilot symbols to be included in transmitted signals sent from a sender to a receiver through an interference-affected propagation environment, the method comprising adaptively determining the pattern of pilot symbols to be included in the transmitted signals by carrying out the following steps:

a) explicitly characterizing the interference-affected propagation environment by defining a covariance matrix of interference and white Gaussian noise based on external measurements of the propagation environment;

b) determining placement positions of a predetermined number of equally powered pilot symbols by computing the placement positions that result in a minimum sum of square errors of a maximum likelihood channel estimation performed based on the covariance matrix, and c) with the pilot symbols in the placement positions, determining a relative power distribution between the placed pilot symbols by computing the power distribution that results in a minimum sum of square errors of a maximum likelihood channel estimation performed based on the covariance matrix, wherein the external measurements of the propagation environment, the determination of the placement positions of the pilot symbols and the determination of the relative power distribution between the placed pilot symbols are carried out by the receiver, the determined placement positions and relative power distribution constituting the pattern of pilot symbols, and wherein the receiver sends the pattern of pilot symbols to the sender so that the sender can include the pilot symbols in its transmitted signals.

2. The method as claimed in claim 1 in which the external measurements of the propagation environment are carried out by spectrum sensing techniques.

3. The Method as claimed in claim 1, in which determining the placement positions of pilot symbols in step (b) includes:

finding an equally spaced pilot pattern that results in the least sum of square errors fit to the covariance matrix where the covariance matrix has been constrained to be diagonal; and iteratively updating the position of each pilot symbol so as to result in the minimum sum of square errors of a maximum likelihood channel estimation performed based on the covariance matrix.

4. The method as claimed in claim 1 in which a new pattern of pilot symbols is determined by the receiver and sent to the sender each time the covariance matrix of the interference and white Gaussian noise changes.

5. The method as claimed in claim 1 in which a new pattern of pilot symbols is determined by the receiver and sent to the sender at regular preset time intervals.

6. The method as claimed in claim 1 in which, prior to the receiver determining the pattern of pilot symbols, the sender detects surrounding interference and noise levels across a range of subcarriers to determine which subcarriers are available for transmission and transmits the information about which subcarriers are available for transmission to the receiver, so that the receiver can compute the pattern of pilot symbols in such a way that no pilot symbols are placed in subcarriers that are unavailable for transmission by the sender.

7. The method as claimed in claim 1 in which the method includes the additional step of determining a phase assignment for each of the pilot symbols by computing a phase value set that results in a minimum sum of square errors of a maximum likelihood channel estimation performed based on the covariance matrix.

8. The method as claimed in claim 1 in which the method includes an initial step of determining a predetermined number of pilot symbols to be included in each transmission block as equal to a channel impulse response length of the system, thereby ensuring that the number of pilot symbols included is a minimum number required for reliable channel estimation.

* * * * *